July 18, 1950 A. PRESZLER 2,515,611
FLEXIBLE SHAFT GREASING FITTING
Filed June 8, 1948

INVENTOR,
ALVIN PRESZLER.
BY
E. E. Vrooman & Co.,
attys.

Patented July 18, 1950

2,515,611

UNITED STATES PATENT OFFICE 2,515,611

FLEXIBLE SHAFT GREASING FITTING

Alvin Preszler, Huntington Park, Calif.

Application June 8, 1948, Serial No. 31,650

1 Claim. (Cl. 184—105)

This invention relates to flexible shaft greasing fittings.

An object of this invention is to provide a simple fitting which enables a mechanic to thoroughly lubricate automobile speedometer cables and housings, without removing them from the motor vehicle.

Another object is to provide a fitting which can be screwed into, or onto, the end of the cable housing, and grease then applied to said fitting, by means of a regular grease gun, or service station lubricator system.

A still further object is to provide fittings with threaded ends corresponding with the sizes and types of thread used on various speedometer housings.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view in side elevation of a device constructed in accordance with this invention, while

Figure 3 is a view in side elevation of another embodiment of this invention, while

Figure 1:
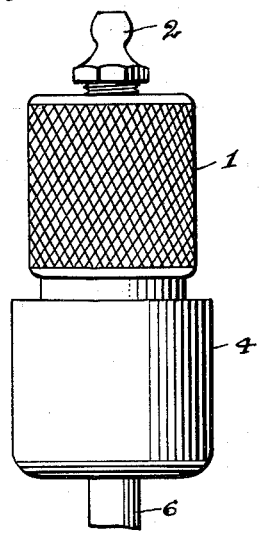
Figure 5:
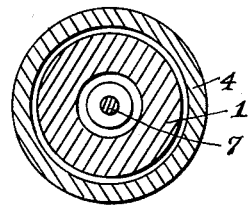
Figure 5 is a horizontal, sectional view, taken on line 5—5, Fig. 2, and looking in the direction of the arrows.
Figure 2:
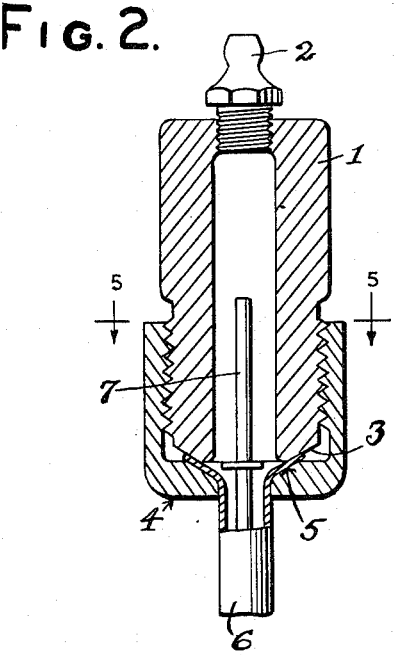
Figure 2 is a vertical, central, sectional view of the same.

Referring to the drawings, and to the embodiment illustrated in Figures 1, 2 and 5, I designates a hollow body which is exteriorly threaded on its lower portion. The body I is open at both its inner and outer ends. The outer end is preferably closed by a screw-type plug 2. The inner end of the hollow body I is provided with a pressure portion in the nature of an inclined beveled surface 3.

An internally threaded clamping section 4 is mounted on the threaded part of the body I. The clamping section 4 is provided with an annular beveled seat 5 which registers with the beveled end 3 on the body I.

When it is desired to lubricate the speedometer cable housing 6, said housing is disconnected from the speedometer, and the disconnected end is placed in the device, as clearly shown in Figure 2, with the speedometer cable shaft 7 partly extending into the body I. In this position, the end of the housing 6 will be clamped between the annular beveled portion 3 and the annular beveled seat 5. Then the plug 2 is removed and the means for supplying the lubricant is inserted in the outer end of body I, that is usually occupied by the plug 2.

Figure 3:
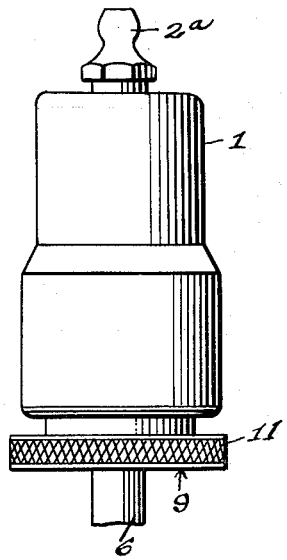
Figure 4:
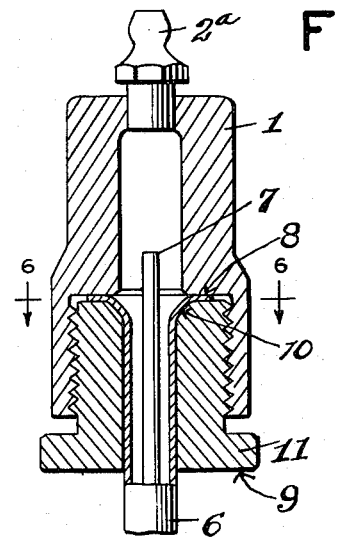
Figure 4 is a vertical, central, sectional view of the same.
Figure 6:
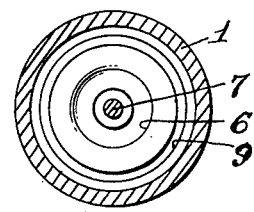
Figure 6 is a horizontal, sectional view, taken on line 6—6, Fig. 4, and looking in the direction of the arrows.

In the embodiment shown in Figures 3, 4 and 6, the body I is internally threaded at its lower end, with a flat pressure portion 8 formed in the body. A clamping section 9 is threaded into the body I, as clearly shown in Figure 4. The clamping section 9 has an annular beveled seat 10 against which the outer portion of the speedometer cable housing 6 may engage. When in the engaging position, a portion of said cable housing 6 will also bear against the flat pressure portion 8 of the body I. Closing the outer end of body I is a drive-in type of plug 2a.

On some makes of automobiles, such as "Ford" products and older "Chrysler" products, a device such as shown in Figure 2 shall be used. On practically all 1940 and later models, except "Ford," the type shown in Figure 4 shall be used.

The interior of the hollow body shall be of sufficient diameter to permit the protruding portion of housing 6 not to interfere with the passage of the lubricant.

In the embodiment shown in Figures 1, 2 and 5, the body I is knurled, as shown clearly in Figure 1, while in the embodiment shown in Figures 3, 4 and 6, the annular portion 11 of the clamping section 9 is knurled, as clearly shown in Figure 3.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a lubricating coupling for flexible shafts having a revoluble power conducting member and having an axially aligned lubricant admission opening in its upper end and a tubular non-revoluble flexible casing; a connector for supply of a lubricant comprising clamping means for gripping the edge of an outwardly flared terminal edge of said casing while leaving said power conducting member free to revolve in said casing, said clamping means including a tubular upper member fitting in spaced relation around said power conducting member; a lower tubular member fitting closely on said casing, said last two members having confronting bevelled casing edge gripping faces, and removable means normally closing the lubricant admission opening.

ALVIN PRESZLER.

REFERENCES CITED

The following references are of record in the file of this patent:

UNITED STATES PATENTS

| Number | Name | Date |
| --- | --- | --- |
| 1,357,966 | DeCorrevont | Nov. 9, 1920 |
| 1,468,040 | Smith | Sept. 18, 1923 |
| 1,893,441 | Parker | Jan. 3, 1933 |
| 2,189,566 | Kreidel | Feb. 6, 1940 |
| 2,191,582 | Parker | Feb. 27, 1940 |
| 2,463,196 | Parker | Mar. 1, 1949 |